United States Patent [19]
Segawa

[11] 3,873,162
[45] Mar. 25, 1975

[54] HUB MOUNTING MEANS FOR BICYCLE

[75] Inventor: Takashi Segawa, Sakai, Japan

[73] Assignee: Shimano Industrial Company, Limited, Osaka, Japan

[22] Filed: Feb. 15, 1974

[21] Appl. No.: 442,820

[30] Foreign Application Priority Data
Feb. 20, 1973 Japan.............................. 48-22663

[52] U.S. Cl................ 301/105 B, 151/30, 151/2 A, 151/14, 301/114
[51] Int. Cl.............................................. B60b 27/04
[58] Field of Search ........ 301/105 B, 105 R, 108 R, 301/108 S, 111, 112, 122, 118, 115, 116, 114; 151/30, 14, 2 A

[56] References Cited
UNITED STATES PATENTS
3,220,784   11/1965   Kilmer............................ 301/105 B
FOREIGN PATENTS OR APPLICATIONS
79-1882    1/1882    United Kingdom ................ 301/114

*Primary Examiner*—M. Henson Wood, Jr.
*Assistant Examiner*—D. W. Keen
*Attorney, Agent, or Firm*—Stevens, Davis, Miller & Mosher

[57] ABSTRACT

Means for mounting a hub for a bicycle to a frame member thereof. The hub mounting means includes a main body having two round holes perforated therethrough and connected co-axially with each other, namely, a threaded hole screwably engagable with the main shaft of the hub and a hole having a diameter larger than that of the threaded hole, and the latter is insertibly provided therein with a friction member resiliently coming into contact with the outer periphery of the main shaft so that the friction member is retained axially unmovably thereto, whereby the main body is screwably engaged with the threaded portion of the main shaft for fixing the main shaft at the screwably engaged position therewith.

7 Claims, 5 Drawing Figures

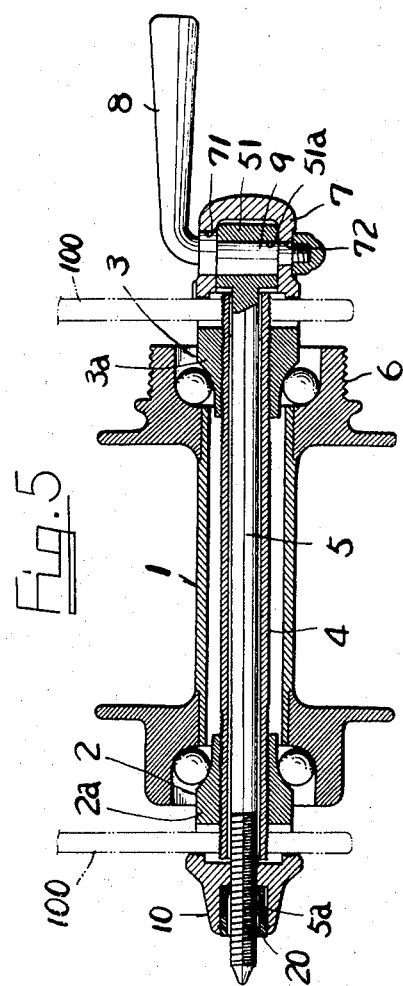

HUB MOUNTING MEANS FOR BICYCLE

This inventin relates to a means for mounting a hub of a bicycle to a frame member of a bicycle, and more particularly relates to a means for mounting a hub which is fixed to a wheel of a bicycle through the spokes thereof with respect to a frame member, namely, a front and a rear fork-like frame members of a bicycle.

Conventionally, a hub for bicycles comprises a hub shell, a main shaft rotatably supporting the hub shell and bearing means fitted between the hub shell and the main shaft, which attaches the main shaft to the frame member of a bicycle so as to make the abovementioned wheel of a bicycle freely rotatable through the hub. In order to fix the main shaft to the frame member of the bicycle, a nut means is used so as to be screwably engaged with a threaded screw portion provided on the main shaft, or, conventionally, in the so-called quick release hub, a nut means which is screwably engaged with the main shaft and a contact member which is axially moved by turn of a cam attached thereto are employed.

In the former, fastening the nut to rigidly fix the main shaft to the frame member of the bicycle may cause nut looseness in a relatively few cases even if the vibration of the bicycle in running is conveyed thereto. However, in the latter quick release hub, since the nut is made adjustable, it is released by vibration caused by the bicycle in running, resulting in the fear that the wheel of the bicycle will often be removed therefrom. Further, in the replacement of a wheel of the bicycle, any foreign object striking the nut, may occasionally allow the adjusted position thereof to be out of order so that readjustment of the nut is required for attaching the wheel. For example, when the bicycle is used for a cycle race, there is the disadvantage that the replacement of the wheel takes a considerable amount of time.

Namely, in a conventional quick release hub the constitution of mounting a hub to a bicycle is that the main shaft of the hub is provided at one end thereof with a nut screwably engaged therewith and at the other end thereof is formed a swollen portion having a perforated hole extending perpendicular to the axis of the main shaft. The swollen portion is mounted internally of the abovementioned contact member of a cap-like form and the perforated hole of the swollen portion is fabricated therein with a cam means having a lever, thus the rotation of the lever permits the abovementioned contact member to be moved axially with respect to the main shaft, wherein one leg of the fork-shaped frame of the bicycle is insertibly supported with the aforegoing bearing means of the hub and a nut screwably engaged with the main shaft at one end thereof. On the other hand, the other leg of the fork shaped frame is placed between the contact member and the bearing means so that the contact member is forced to be moved to insertibly support the leg of the fork-shaped frame member by means of the cam rotation, whereby the hub is mounted to the fork-shaped frame member of bicycles. This method has advantage such that the operation of only turning the lever permits the hub to be quickly mounted to or dismounted from the fork-shaped frame member of the bicycle, and accordingly for this reason, it has been widely used in recent years.

However, in the same method, the cam turning makes the contact member be moved to mount the hub to the fork-shaped frame member after the adjustment of the position of the nut is freely adjustable so as not to be rigidly fastened to the fork of the frame member when mounted thereto, whereby the nut is liable to loosen by vibrations caused by the bicycle in running, resulting in the occurrence of the fear that the wheel, as abovementioned, frequently comes off of the frame of the bicycle.

Additionally, for the purpose of eliminating these defects, for example, a nylon bush or a spring washer is employed, or a bolt is used for locking the nut, which have disadvantages such as complexity of construction and manufacturing, and the problems in handling thereof.

In view of the defect as abovementioned the present invention is designed and a main object of the invention is to provide a means for mounting a hub of the bicycle, which fixedly holds the hub so as not to come off of the frame member of the bicycle. Another object of the invention is to provide a means having no defect of the aforegoing spring washer or locking washer and having a simple operability and an accurate effect to prevent the looseness of the nut.

A further object is to provide a means for mounting a hub to the bicycle, which is suitable for attaching a quick release hub to the bicycle and capable of exactly maintaining the adjusted position thereof while the hub is desirably adjusted to have the proper spaced interval thereof.

Incidentally, the present invention has designed the improvement of a nut conventionally used for fixing the main shaft of a hub to the frame member of a bicycle so that the problem regarding the nut is overcome. Particularly, in case the nut of the invention is substituted for conventional nuts used for adjusting the screwably engaged position thereof with the main shaft of the hub, the nut may have the most effective function so as to exactly hold the position screwably engagable with the main shaft of the hub, thereby to securely fix the main shaft of the hub to the frame member of the bicycle.

Namely, in accordance with the present invention, the hub mounting means has a main body thereof provided with two holes perforated therethrough coaxially to each other, namely, a threaded hole screwably engagable with the thread screw portion of the main shaft to the hub and a hole adjacent thereto having a larger diameter than that of the threaded hole and into the latter is insertibly mounted a friction member which resiliently comes into contact at the inner surface thereof with the outer periphery of the main shaft in a manner that the same is rigidly restrained unmovably to the main body in the axial direction thereof, thus the resilient contact of the friction member with the outer periphery of the main shaft permits the screwably engaged position of the main body to be exactly secured.

The present invention is described in detail as aforegoing and the novel construction of the invention is within the scope of the appended claims hereinafter.

In explanation of the accompanying drawings,

FIGS. 3 and 4 are vertical section views of the hub mounting means, wherein FIG. 3 shows the condition thereof just before screwable engagement with a main shaft and FIG. 4 shows the conditions thereof just after screwable engagement with the main shaft.

FIG. 5 is a vertical cross section view showing an embodiment applied on a quick release hub.

An embodiment of a hub mounting means of the invention will be described in according with accompanying drawings as follows.

Figure 1:
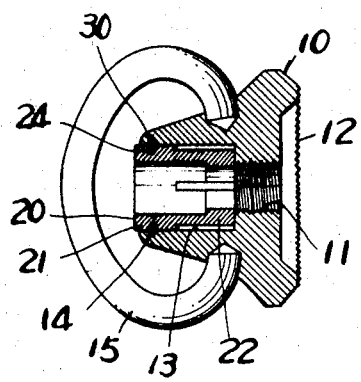
FIG. 1 is a vertical section view of a hub mounting means of the invention.
Figure 2:
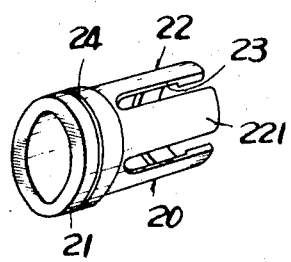
FIG. 2 is a perspective view of a friction member having a principal construction of the invention.
Figure 3:
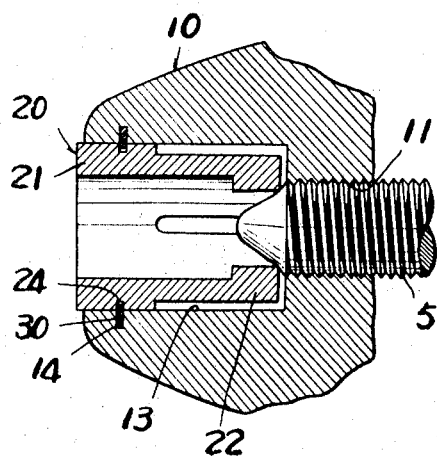
Figure 4:
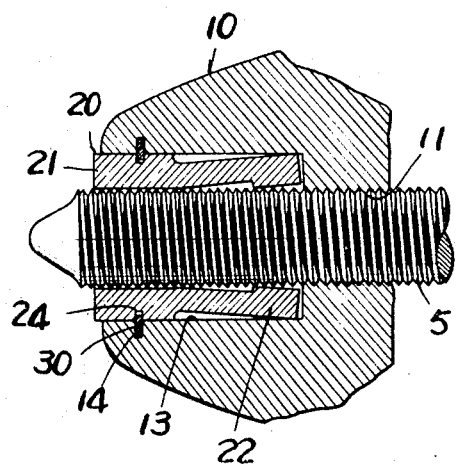

In FIGS. 1, 2 and 3, a hub mounting means having a main body 10 is provided at the center portion thereof with a threaded hole 11 and, as described hereinafter, is screwably engaged with a main shaft 5 of the hub and with the serration formed on the surface of the rear side thereof. The main body 10 is made of metallic material such as steel and the like and is provided with a hole 13 which is connected to the threaded hole 11 and has a larger diameter than the inner diameter of the threaded hole 11.

A friction member 20 is inserted into the larger hole 13 of the main body 10 of the hub mounting means. Friction member 20 is made of a resilient and wear-resistant material, for example, phosphor bronze or synthetic, and is substantially cylindrical in shape, Further, the friction member 20 has an outer diameter slightly smaller than the inner diameter of the larger hole 13 and comprises a base portion 21 which is unmovably retained in the larger hole 13 in the axial direction thereof and a frictionally contacting portion 22 which is expandable radially thereof extends from the base portion 21 in the axial direction. The frictionally contacting portion 22 is of a cylindrical shape and may be provided, as shown in FIG. 2, with a plurality of slots 23 extending axially thereof to form a plurality of frictional fin elements 221 supported at one end thereof to the base portion 21.

Further, the frictionally contacting portion 22 has an inner diameter smaller than the major diameter of the thread screw of the main shaft 5 of the hub and an outer diameter smaller than the inner diameter of the larger hole 13, is allowed to frictionally come into contact with the outer periphery of the main shaft 5 of the hub when the main body 10 is screwably engaged with the main shaft 5.

The frictionally contacting portion 22 need not have a uniform inner diameter throughout the whole length of the same. For example, only the utmost end portion of the same is, as illustrated, formed so thick in somewhat length that the inner diameter thereof becomes smaller than the major diameter of the thread screw portion of the main shaft. In this case the intermediate portion between the base portion 21 and the above-mentioned end portion 22, can be made substantially thinner than the latter, thereby increasing the resiliency thereof.

In order that the friction member 20 constituted as abovementioned is fixed axially unmovably to the larger hole 13, the outer periphery of the base portion of the friction member 20 and the inner surface of the larger hole 13 are respectively provided with annular grooves 24 and 14 in which a snap ring 30 is inserted. Also, an adhesive is employed for the same purpose. Additionally, in FIG. 1 the numeral reference 15 designates a ring which is attached to the main body 10 of the hub mounting means for rotating the main body 10.

The way of mounting the hub to the frame member of the bicycle by means of the hub mounting means of the invention consituted, as abovementioned, will be described in accordance with FIG. 5.

A hub as shown in FIG. 5 is, so-called, a quick release hub which comprises a hub shell 1, a pair of bearings 2 and 3 for rotatably supporting the hub shell 1, a tubular shaft 4 screwably engaged with ball holders 2a and 3a of the bearings 2, 3 and a main shaft 5 perforating through the tubular shaft 4. Further, the hub shell 1 is provided at one end portion thereof with a threaded screw 6 for fitting a freewheel (not shown in drawings) of the bicycle. The freewheel is engaged with a chain (not shown) to allow the hub shell to be rotated with the movement of the chain caused by pedalling the bicycle. Furthermore, the main shaft 5 is provided at one end portion thereof with a threaded screw 5a and also at the other end portion thereof with a swollen portion 5 in cylindrical shape of larger in diameter than the main shaft 5. The swollen portion 51 has a hole 51a perforated therethrough in the direction perpendicular to the axis of the main shaft 5.

The swollen portion 51 is covered with a cap-shaped contact member 7 which has at two opposite walls thereof two holes 71 and 72 perforated therethrough respectively, wherein the former has a larger diameter than that of the latter.

The abovementioned perforated holes 71, 72 and 51a are respectively inserted therethrough with a cam member 9 having a lever 8 connected thereto, and a portion of the cam member 9 projected outwardly of the contact member 7 through the perforated hole 72 is screwed with a stop nut, thereby to rotatably support the cam member within the abovementioned perforated holes. Further, the cam member 9 is constructed so that the portion thereof to be inserted into the perforated hole 71 having a larger diameter is not co-axial to the portion to be inserted into the hole 51a perforated through the swollen portion 51 of the main shaft 5, whereby the turn of the cam 9 permits the contact member 7 to be moved axially thereof for adjusting the fitting spaced interval of the hub.

Incidentally, the hub mounting means fo the invention is applied for mounting the hub constituted as abovementioned to the bicycle so that the threaded hole 11 of the main body 10 of the hub mounting means is screwably engaged with the threaded screw portion 5a of the main shaft 5.

Namely, first the main body 10 is screwably engaged with the main shaft 5 so that the length of the spaced interval between the main body 10 and the contact member 7 is adjusted to be coincided with that between two legs 100 of the fork-like frame member of the bicycle. Secondly two legs 100 are placed respectively between the main body 10 and the ball holder 2a at one side of the hub and between the contact member 7 and the ball holder 3a at the other side of the hub. Thereafter the lever is turned 8 permitting the cam member 9 to be turned for moving the contact member 7 in the axial direction thereof, thereby to mount the hub to the frame member of the bicycle.

In the case of using the hub mounting means for the bicycle, there is provided the friction member 20 within the main body 10 screwably engaged with the main shaft 5 and the frictionally contacting portion 22 of the friction member 20 is expanded radially thereof by the outer periphery of the main shaft projected thereinto, resulting in resiliently grasping the main shaft therewith, whereby the main body 10 is exactly prevented from the rotative movement thereof even if it is apt to rotate per se by the vibration caused by the bicycle in running, thus the main body 10 precisely retained at the adjusted position thereof without occurrence of error with respect to the adjustment of the same.

The hub mounting means in accordance with the present invention is not limited to be used for the abovementioned quick release hub but applicable to a hub unremovably mounted to the bicycle. Particularly, the effect of using this hub mounting means for the quick release hub may be extremely raised so that the hub mounting means can exactly hold the main body thereof at the adjusted screwably engaged position with the main shaft of the hub, whereby the hub's unexpected removal from the frame member of the bicycle in its running is prevented.

This invention is not limited only to an inherent construction of the embodiment and various changes and modifications may be made in the invention without departing from the spirit and scope thereof as hereinafter claimed.

What is claimed is:

1. A hub mounting means for a bicycle, which is screwably engaged with a threaded screw portion provided on a main shaft, rotatably supporting a hub shell, at least at one end of said main shaft in the axial direction thereof so that said main shaft is fixed to a frame member of a bicycle, said hub mounting means comprising:
   a. a main body having a threaded hole screwably engaged with said threaded screw portion of the main shaft, said main body also having a hole which has a larger diameter than that of said threaded hole and is connected thereto,
   b. a friction member inserted into said hole larger in diameter, said friction member comprising
      a base portion insertibly supported within said hole larger in diameter in contact with the inner surface thereof, and
      a frictionally contacting portion which extends from said base portion in the axial direction thereof and which is expandable in the radial direction thereof, said frictionally contacting portion resiliently coming into contact with the outer periphery of said main shaft, and
   c. a means for fixing said friction member to said hole larger in diameter.

2. A hub mounting means according to claim 1, wherein said friction member is made of a resiliently deformable material.

3. A hub mounting means according to claim 1, wherein said friction member is made of phosphor bronze.

4. A hub mounting means according to claim 1, wherein said friction member is substantially cylindrical and said frictionally contacting portion of said friction member is provided with a plurality of slots extending axially thereof which form a plurality of frictionally contacting fin elements.

5. A hub mounting means according to claim 1, wherein said friction member is substantially cylindrical and the frictionally contacting portion of said friction member has an inner diameter smaller than the major diameter of the threaded screw portion of said main shaft.

6. A hub mounting means according to claim 1, wherein said friction member is mounted with a snap ring to the hole larger in diameter provided in said main body thereof.

7. A hub mounting means for a bicycle, which is provided with a tubular shaft rotably supporting hub shell, a main shaft penetrating through said tubular shaft at the center thereof, at one end of said main shaft in the axial direction thereof a contact member coming into contact with the outer surface of one of two legs of a fork-like shaped frame of the bicycle and an operating lever having a cam means which permits said contact member to be moved in the axial direction with respect to the main shaft, and at the other end of said main shaft a threaded screw formed thereon, thereby to be screwably engaged with said threaded screw for fixing said main shaft and said tubular shaft to the frame of the bicycle, said hub mounting means comprising:
   a. A main body having a threaded hole screably engageable with the threaded screw of said main shaft, and a hole larger in diameter than said threaded hole and co-axially connected thereto,
   b. a friction member inserted into said hole larger in diameter, said friction member comprising:
      a base portion which comes into contact with said hole to be supported therewith, and
      a frictionally contacting portion which extends from said base portion in the axial direction thereof and is capable of expanding in the radial direction thereof, said frictionally contacting portion resiliently coming in contact at the inner surface thereof with the outer periphery of said main shaft, and
   c. a means for fixing said friction member to said hole larger in diameter
   d. a rotable operating element for permitting the main body to be rotated for the screwable engagement thereof with the thread screw of said main shaft.

* * * * *